UNITED STATES PATENT OFFICE.

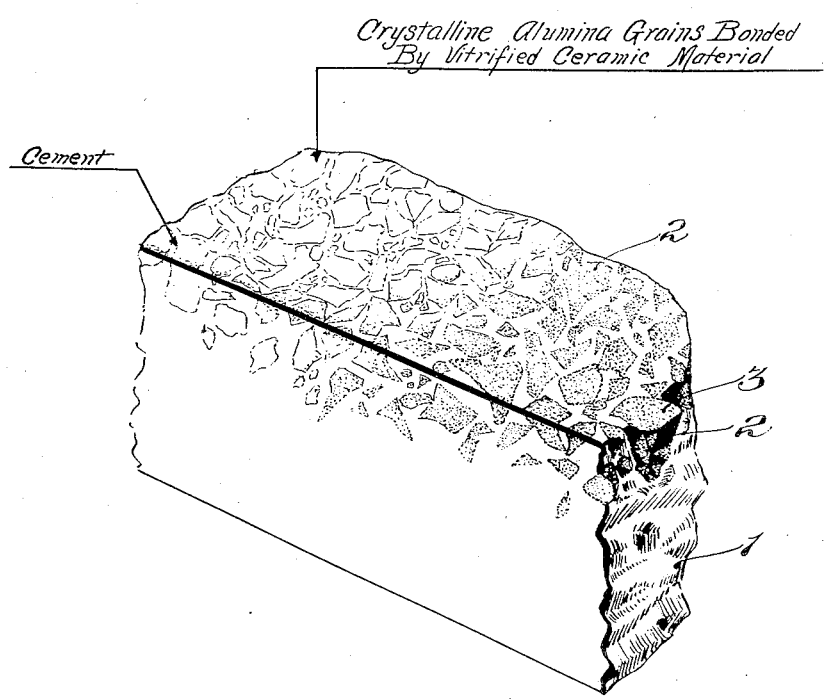

GEORGE N. JEPPSON, OF WORCESTER, MASSACHUSETTS, ASSIGNOR TO NORTON COMPANY, OF WORCESTER, MASSACHUSETTS, A CORPORATION OF MASSACHUSETTS.

TERRAZZO FLOORING.

1,371,683.    Specification of Letters Patent.    Patented Mar. 15, 1921.

Application filed February 1, 1919. Serial No. 274,509.

*To all whom it may concern:*

Be it known that I, GEORGE N. JEPPSON, a citizen of the United States of America, residing at Worcester, in the county of Worcester and State of Massachusetts, have invented certain new and useful Improvements in Terrazzo Flooring, of which the following is a full, clear, and exact specification.

My invention relates to safety treads and to materials therefor which will form a hard, wear resisting, anti-slipping surface.

It is well known that cement or concrete sidewalks and similar surfaces are not well adapted for excessive pedestrian wear and that they frequently are slippery and liable to cause accidents. It has been proposed to embed grains of crystalline alumina or silicon carbid in such cements to prevent slipping. When small grains of alumina or silicon carbid are used, the comparatively soft cement necessarily forms a large portion of the total volume, and so is considerably exposed on the surface of the tread and subjected to wear. Furthermore, the cement is not in itself a hard bonding substance and does not make such intimate contact with these very small grains as will hold them permanently in place. Hence, when subjected to the shocks of traffic and the abrasions of pedestrian wear, the cement is unable to stand the strain, thereby permitting the grains to be torn from the surface and exposing further cement and other grains to similar disintegrating action. As a result the tread made of small granular material bonded in cement has a short life and is otherwise unsatisfactory. If very large pieces of silicon carbid or granular crystalline alumina are used the tread is likewise unserviceable. In this case, if the anti slipping, wear-resisting medium is silicon carbid, it fractures easily and crumbles away and if it is alumina it becomes slippery by wearing down to a smooth plane surface. This latter effect is due to the fact that the crystals form closely knit masses of substantially uniform hardness throughout, hence the tendency of all frictional or abrasive action is to smooth down the projecting portions and form a polished surface. It is customary to decorate concrete floorings for halls etc., by embedding marble chips therein. This type of flooring, known as terrazzo, is not anti-slipping or wear-resisting since the marble forms a very slippery surface and is not sufficiently hard to stand any large amount of wear and protect the soft cement bond.

It is accordingly an object of my invention to provide a tile or a tread surfacing, of the nature of terrazzo, which can be formed or laid in plastic condition and thereafter set to produce a hard, wear-resisting, anti-slipping surface capable of withstanding the impacts and abrasions of traffic and pedestrian wear and remaining indefinitely a satisfactory safety tread. Further objects will be readily apparent from the following disclosure.

I have discovered that the terrazzo type of flooring may be adapted for safety treads by utilizing a chip or chunk of material which is permanently anti-slipping and highly wear resisting and which can be embedded in and bonded by a plastic setting cementitious material. To obviate the above mentioned difficulties, it is desirable that the chips be made up of small grains of durable anti-slipping material of a hardness of 9 or more on Moh's scale which are bonded together by a substance capable of holding these grains in place almost indefinitely under the ordinary impacts of pedestrian wear. At the same time, this bonding material should be enough softer than the anti-slipping granules, so that it may break away under the severest of strains or wear down faster than the grains when exposed to abrasion and so prevent the formation of a smooth polished surface and occasionally permit new granules with fresh edges to be exposed to footwear. For the hard, wear-resisting, anti-slipping material I preferably utilize crystalline alumina, such as corundum, emery, electrically fused alumina etc., or silicon carbid. While grains of various sizes may be utilized, I preferably select a mixture of coarse grains of about 36 mesh mixed with finer sizes to give a dense, compact structure.

For the bonding medium, I preferably utilize a ceramic bond which will burn or vitrify at a high temperature to a very hard material capable of making intimate contact with the grains and holding them indefinitely in place or until they have become so worn as to lose their anti-slipping qualities. While various well known bonds may be utilized to form these chips, I prefer one which gives an exceedingly hard and durable vitrified or glassy mass. A serviceable mixture may comprise the following ingredients:

Slip clay _____ 44 parts by weight.
Feldspar _____ 44 " " "
Ball clay _____ 12 " " "

These proportions may obviously be varied and other materials added or substituted for the ingredients mentioned, depending upon the bond characteristics desired, as is well known to one skilled in this art. The bond above specified is formed by crushing the materials and mixing them in the dry condition in suitable proportions with the crystalline alumina. The mixture is then dampened with water sufficiently to form it by the dry press process into lumps or shapes of convenient size for handling and preferably of a uniform size. These lumps may be burned in a suitable ceramic kiln at approximately 1300° centigrade for from 50 to 100 hours, depending upon the nature of the bond and the conditions of burning, to produce a hard vitreous mass; after which the product is cooled slowly. If these lumps are too large for use they are preferably broken in a rock crusher to chips which grade preferably from ⅛" to 1" in size.

In order to make a slip-proof surface I incorporate these chips in a suitable cementitious plastic mass capable of setting to a solid body. While various cementitious materials may be utilized, I preferably use hydraulic cement and I may make use of the various processes known in the art of laying concrete or cement floors. As a specific example of one type of process, I may lay a cement flooring of Portland cement and water, which may be mixed with sand, aggregate or other suitable ingredients according to well known methods. To make a safe tread therefor, I make the top layer preferably of cement alone without the addition of large grains or aggregates and while it is still plastic, but after it has set somewhat, I may cover the surface with a layer of my slip-proof, wear-resisting chips of suitable sizes and roll or otherwise force them into the cement. If desired, further increments of chips may be added, and rolled, each preferably after an interval in which the cement is permitted to harden still further. It of course is obvious that the chips may be initially mixed with cement and water and the mass laid either as a surfacing on a concrete base or in one layer if it is desired to have the chips extend throughout the full thickness of the flooring; or the chips may be laid in place and cement grouting poured over them. Various other methods well known in this art may obviously be utilized. It is considered that the porosity of the chip assists in bonding it with the cement. If it is desired, however, that the chips, or those which are adapted to be exposed on the surface, have small capillarity they may be made dense and compact in structure, or I may give the finished surface a coating of wax to fill the exposed pores. When the concrete has become quite hard, I grind off the projecting portions of the chips and into the concrete sufficiently to provide a plane, continuous surface, in which the chips form the larger portion of the tread. This is preferably accomplished by utilizing a rotary grinding wheel suitably moved over the surface of the floor.

While this invention is particularly applicable to laying floors in a plastic condition, yet it is within the scope of my invention to provide tiles or blocks of material made up in this fashion, and lay them as a sidewalk or other flooring of similar type would be made. In this case, the terrazzo composition may be formed in a mold or by other suitable means to provide a form of desired geometrical shape and proportions. To make a floor of tiles, they may be laid on a bed of plastic concrete and the joints suitably filled with cement or other cementitious material.

In the drawing, I have illustrated a fragment of a flooring or a tile, after the same has been completed, in which the cement body 1 has embedded only in the top layer thereof the chips 2 of ceramic bonded crystalline alumina. As illustrated, the surface has been ground down to provide the chips with plane top surfaces 3. Also, the chips are shown thickly placed so as to occupy the major portion of the volume of the upper part of the tread in order that the cement may not be largely exposed to the abrasion of footwear. They are of irregular shape and are relatively small compared with the size of one's foot. These chips are shown as scattered throughout the top layer, preferably without reference to any design, although they may be formed in regular shape and placed in suitable pattern if the greater expense of such a flooring is advisable.

Having thus described my invention what I claim as new and desire to secure by Letters Patent is:

1. A tread surface composition comprising a cementitious magma and irregularly shaped chips rigidly set in and united therewith, said chips being formed of wear-resisting, anti-slipping granules united by a tough bonding material capable of withstanding the disruptive action of normal pedestrian wear.

2. A safety tread composition comprising a cementitious body having embedded in the tread surface thereof chips of hard, wear-resisting, anti-slipping granules of a hardness of 9 or more artificially united by a tough bond capable of preventing disruption of the granules from the surface under the ordinary abrasions of footwear.

3. A safety tread composition comprising a cementitious body having embedded in the tread surface thereof chips of hard, wear-resisting, anti-slipping granules of a hardness of 9 or more artificially united by a tough bond capable of preventing disruption of the granules from the surface under the ordinary abrasions of footwear, said chips occupying the major portion of the exposed tread surface and having rough surfaces embedded in and integrally united with the cementitious body to prevent dislocation therefrom.

4. A terrazzo tread comprising a plane surfaced cement body and irregularly shaped chips of wear-resisting, anti-slipping grains bonded by vitrified ceramic material, said chips being embedded in the cement and integrally united therewith, and the chips which are exposed on the tread surface having substantially plane faces continuous with the top face of the cement and forming such a portion of the tread area as to protect the cement from material footwear.

5. A safety tread comprising a body of cement having embedded in its top portion a layer of chips of fused alumina granules bonded by a vitrified clay into a hard, wear-resisting, permanently anti-slipping mass, said chips having irregularly shaped surfaces integrally united with said cement.

6. A safety tread comprising a body of cement having a plane surface portion and extremely hard, wear-resisting and permanently anti-slipping chips of crystalline alumina grains bonded by vitrified ceramic material, the exposed chips having top faces lying in substantially the same plane as that of the tread surface and constituting such a major portion of the tread as to protect the exposed cement from any considerable wear.

7. A terrazzo chip for tread surfaces comprising crystalline grains of a hardness of 9 or more bonded by a burner ceramic material to a tough, wear-resisting, anti-slipping mass of irregular surface capable of being firmly embedded in cement.

8. A terrazzo chip for tread surfaces consisting of an irregularly shaped mass having a substantially plane wear surface and comprising crystalline grains of hard, wear-resisting, anti-slipping material united by a tough bond capable of preventing disintegration under normal footwear.

9. A terrazzo chip for tread surfaces consisting of an irregularly shaped mass having a substantially plane wear surface and comprising crystalline alumina grains united by a vitrified ceramic material bond into a hard, wear-resisting, anti-slipping mass.

10. A terrazzo chip for tread surfaces comprising crystalline alumina grains bonded by a vitrifiable compound of slip clay, ball clay and feldspar burned to a hard, wear-resisting mass, having an irregular surface adapted to adhere to and be embedded in a cementitious magma.

Signed at Worcester, Massachusetts, this 31st day of Jan., 1919.

GEORGE N. JEPPSON.